C. A. WATSON.
AUTOMOBILE WHEEL.
APPLICATION FILED SEPT. 19, 1914.
1,128,924.
Patented Feb. 16, 1915.
2 SHEETS—SHEET 2.
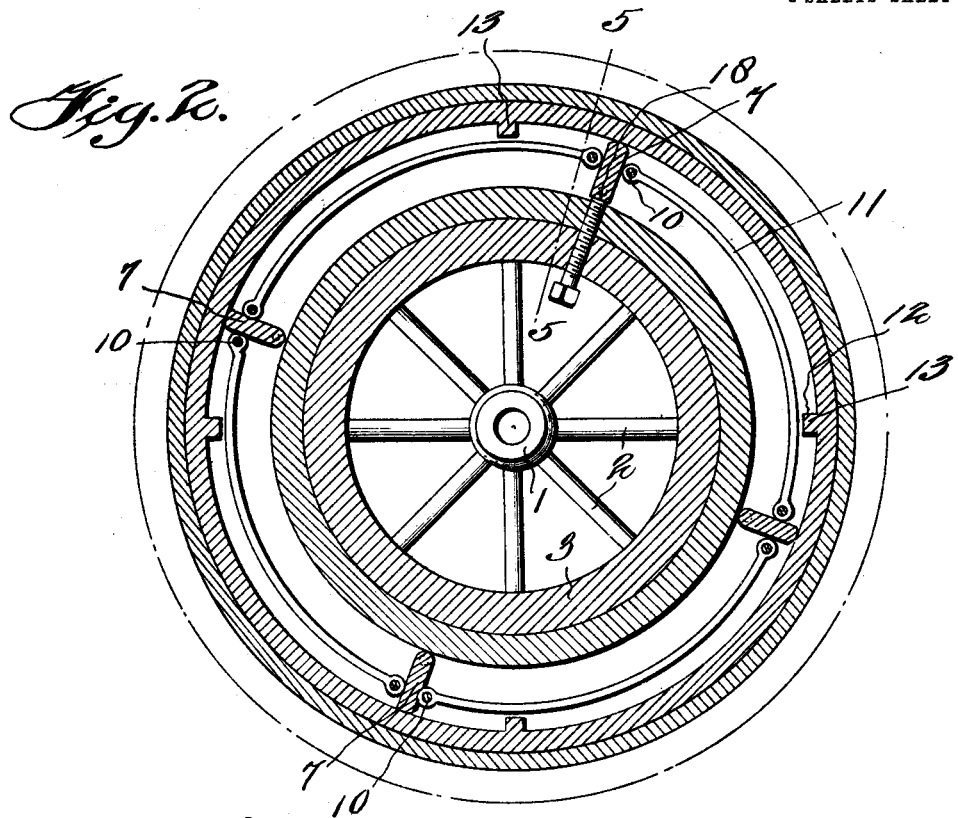
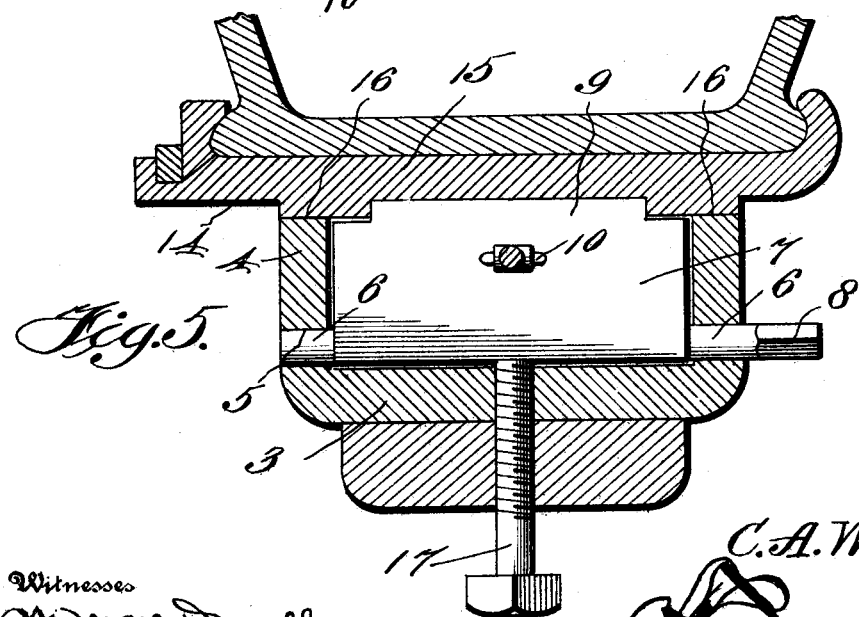
Witnesses
Inventor
C. A. Watson,
Attorney

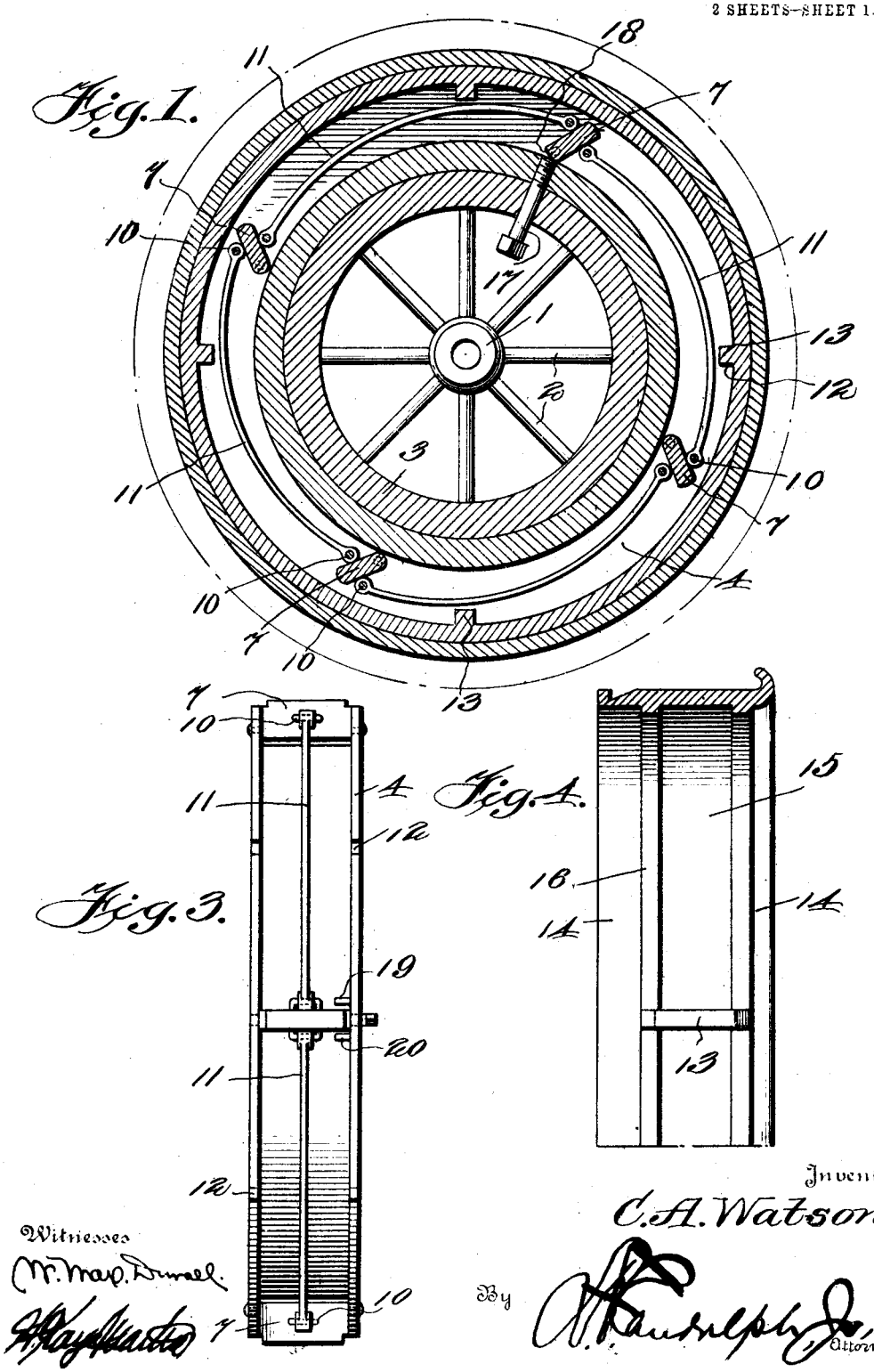

UNITED STATES PATENT OFFICE.

CHESTER A. WATSON, OF CREWS, TEXAS, ASSIGNOR OF ONE-TENTH TO HOWELL SETH HAVENS, OF CREWS, TEXAS.

AUTOMOBILE-WHEEL.

1,128,924.  Specification of Letters Patent.  Patented Feb. 16, 1915.

Application filed September 19, 1914. Serial No. 862,563.

*To all whom it may concern:*

Be it known that I, CHESTER A. WATSON, a citizen of the United States, residing at Crews, in the county of Runnels and State of Texas, have invented certain new and useful Improvements in Automobile-Wheels; and I do hereby declare the following to be a full, clear, and exact description of the invention, such as will enable others skilled in the art to which it appertains to make and use the same.

This invention relates to new and useful improvements in automobile wheels and has for its object to provide a wheel which relates more particularly to the type of wheel which is provided with a demountable rim for interchanging the rim in order to quickly replace a defective tire.

Another object of the invention is to provide a simple and effective means for locking the rim in place on the wheel to hold the same in proper position thereon and prevent any accidental movement thereof.

Still another object of the invention is to provide a novel means for locking the rim retaining means against accidental displacement so that the tires will remain in place at all times.

With these and other objects in view the invention consists in the combination and arrangement of parts which will be fully set forth in the following specification and in the accompanying drawing, in which:

Figure 1 is a longitudinal sectional view of a wheel constructed in accordance with this invention showing the same as it would appear with the rim unlocked. Fig. 2 is a view similar to Fig. 1 illustrating the device having the rim in its locked position. Fig. 3 is an edge view of the wheel showing the rim removed. Fig. 4 is a fragmentary view of the interior of the rim, and Fig. 5 is an enlarged detail sectional view taken on the line 5—5 of Fig. 2.

Referring now to the drawings by characters of reference, the numeral 1 designates the hub of the wheel provided with the usual radiating spokes 2. These spokes are provided at their outer ends with the ordinary rim 3, which rim is provided on its edges with the annular flanges 4, the use of which will appear as the description proceeds.

The flanges 4 hereinbefore referred to are provided at spaced intervals with the apertures 5 which are arranged to receive the cylindrical extensions 6 which are formed on the plates 7. One of these cylindrical extensions 6 is provided with the squared projection 8 the use of which will appear as the description proceeds. Formed on the edge of the plates 7 opposite the inner edge is the extension 9 which terminates short of the ends of the plates as clearly shown in Fig. 5. Formed integral with the plates 7 intermediate of their ends and near the extension 9 are the ears 10 which are arranged to form pivotal connections for the links 11 by means of which these plates are connected in operative arrangement. These links 11 are arranged to be pivotally secured to the plates as previously described and it will thus be apparent, that when the plate having the angular extension 8 formed thereon is operated the entire number of plates surrounding the periphery of the wheel will be operated simultaneously.

Formed at intervals between the plates 7 are provided the notches or recesses 12 which are arranged to receive the ribs 13 which are secured to the demountable rim designated generally by the numeral 14. This rim comprises the annular body 15 provided on its inner side with the flanges 16 which are lateral of the body and are arranged to be engaged by the extension 9, and thereby prevent the body from becoming displaced. This body 15 is provided on its outer side with any suitable means for securing a tire of the ordinary type thereto, and it will readily be seen that with the construction hereinbefore described a rim having a tire already mounted thereon may be substituted in place of the rim with the worn or damaged tire.

In order to lock the rim securing means against movement, there is provided the threaded screw 17 which is arranged to engage the flat edge 18 of one of the plates 7, and it will thus be seen that when the plate is in the position illustrated in Fig. 2 the threaded screw 17 may be tightened and thereby prevent the plate from rocking on its pivot 6.

From the foregoing it will be apparent that when it is desired to substitute a tire for the one already on the wheel, the plates 7 are turned so they will assume the position illustrated in Fig. 1. In this position it will be apparent that the rim may be slid laterally from its position on the wheel, and a substitute rim slipped in place. After the substitute rim and new tire have been placed in position the plates are again turned upwardly so they extend radially with relation to the center of the wheel and in this position it will be apparent that the extensions 9 will engage the flanges 6 and firmly lock the substitute rim against movement. To further insure the device remaining in place the bolt 17 is turned upwardly so as to engage with the flat face of one of the plates 7 and thereby lock the plate against movement in either direction. In order to limit the movement of the plates in both directions there are provided the stops 19 and 20 which are designed to prevent the plates from turning too far either way.

While in the foregoing there has been shown and described the preferred embodiment of this invention, it is to be understood that such changes in the combination and arrangement of parts as may fall within the scope of the claims may be resorted to without departing from the spirit and scope of the invention.

Having thus described the invention, what is claimed as new, is:—

1. The combination with an automobile wheel including a rim having flanges formed thereon at spaced intervals, plates pivoted between the flanges and links connecting the plates so that upon movement of one plate the remaining plates will move simultaneously, of a removable rim, said rim being provided with a pair of spaced inwardly extending flanges, and ribs extending transversely of the rim, said ribs being arranged to hold the rim against annular movement on the wheel.

2. A demountable rim including the combination with an automobile wheel, flanges secured to the rim of the wheel, said flanges extending outwardly and around the periphery of the wheel, plates rotatably mounted between the flanges, links connecting the plates, an extension on one of the plates to control the operation thereof, means to lock the plates against movement, of a demountable rim including an annular body, inwardly extending flanges formed on the annular body, said flanges being spaced the same distance as the first mentioned flanges and being arranged to be engaged by the plates and transverse ribs on the rim and arranged to engage the wheel flanges to prevent the rim from rotating annularly with relation to the wheel.

3. The combination with a motor vehicle wheel including a rim, a pair of flanges formed laterally of the rim, a plurality of pivoted plates mounted to rotate between the flanges, extensions on the plates, links connecting the plates so that upon movement of one of the plates the entire set will move simultaneously, means controlling the movement of the plates, of a tire carrying rim, said tire carrying rim comprising an annular body, inwardly extending annular flanges formed on the body, said flanges being spaced to receive the extensions on the plates and transverse ribs on the flanges to prevent annular movement of the tire carrying rim with relation to the wheel.

In testimony whereof I affix my signature in presence of two witnesses.

CHESTER A. WATSON.

Witnesses:
J. W. RAINWATER,
I. S. BALDWIN.